UNITED STATES PATENT OFFICE.

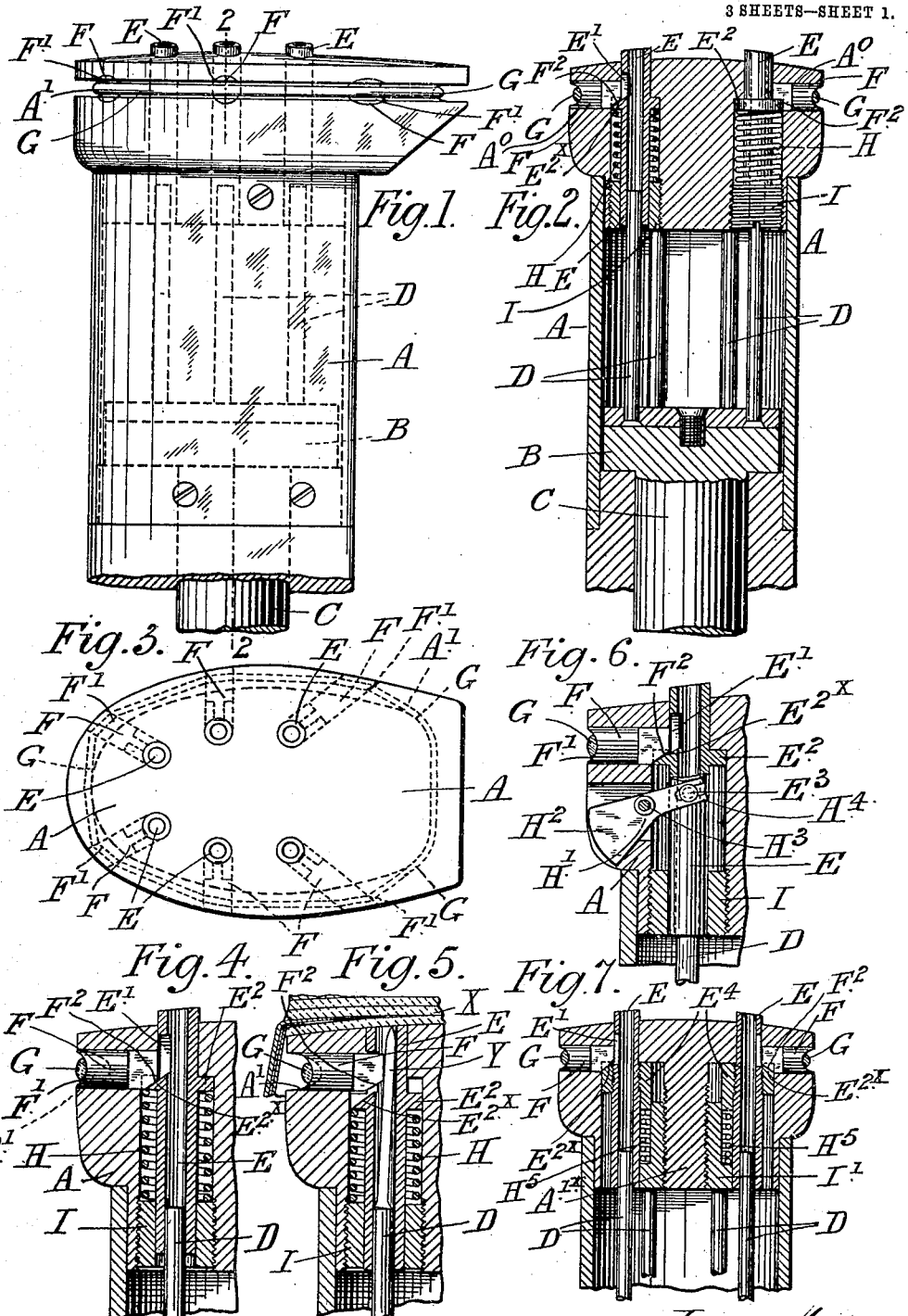

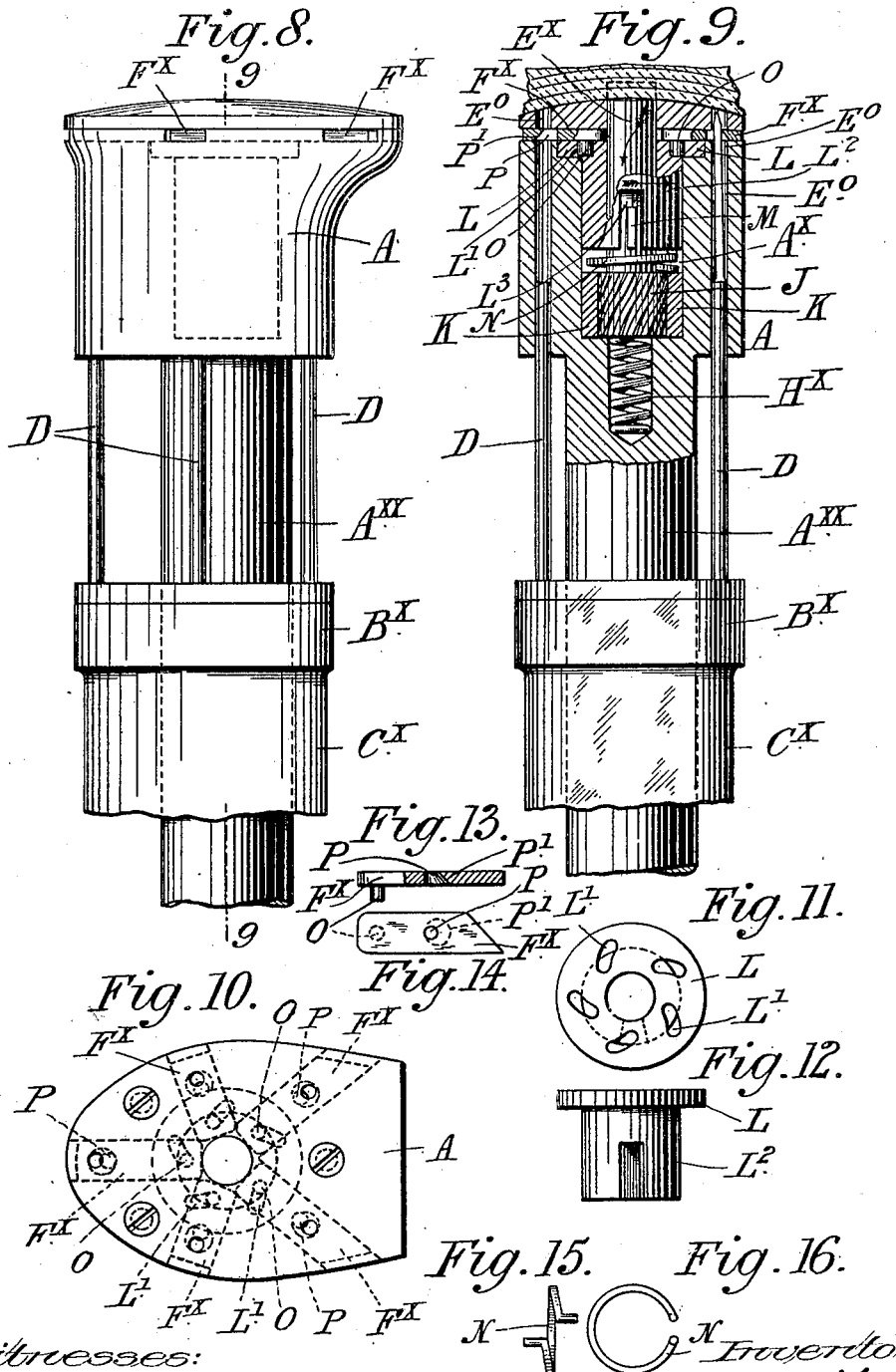

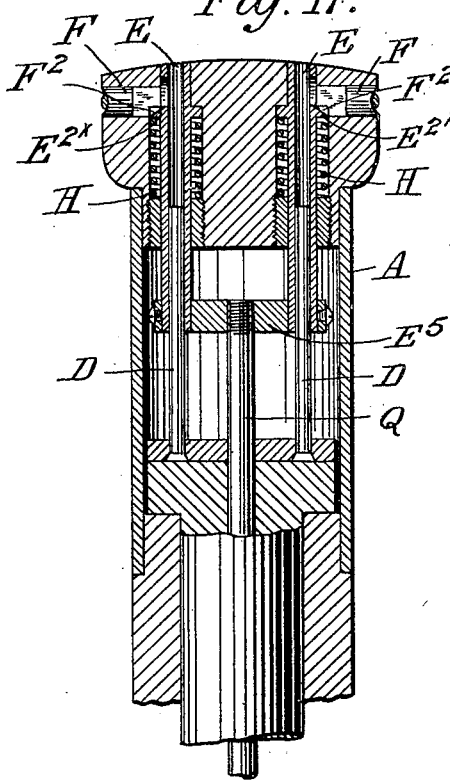
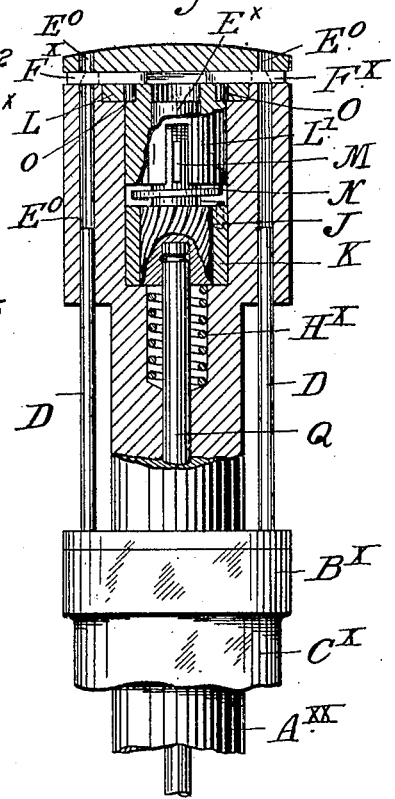
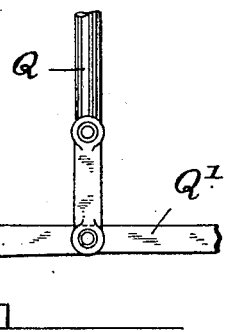

WILLIAM RODERICK BARCLAY AND ARTHUR BATES, OF LEICESTER, ENGLAND, ASSIGNORS TO UNITED SHOE MACHINERY COMPANY, OF PATERSON, NEW JERSEY, A CORPORATION OF NEW JERSEY.

NAIL-DRIVING MACHINE.

No. 919,678.      Specification of Letters Patent.      Patented April 27, 1909.

Application filed July 7, 1904, Serial No. 215,680.   Renewed September 4, 1908.   Serial No. 451,737.

*To all whom it may concern:*

Be it known that we, WILLIAM RODERICK BARCLAY and ARTHUR BATES, respectively, a citizen of the United States of America and a subject of the King of England, both residing at Leicester, in the county of Leicester, England, have invented certain new and useful Improvements in or Relating to Nail-Driving Machines, of which the following is a specification.

This invention relates to nail-driving machines, and more particularly but not exclusively to machines for attaching heels to boots or shoes, in which the nails are sometimes driven from a horn placed inside the boot or shoe, and while being driven are deflected toward the center of the heel by nail-deflectors in the nail passages.

The object of the invention is to permit the nail-holding passages of the horn to be readily loaded with nails without interference from the nail-deflector which as hitherto arranged partially obstructed and rendered difficult the insertion of nails into the nail passage by necessitating the usage of considerable force upon each successive nail to make it displace the deflector as it entered into the nail passage. Furthermore, in addition to the above cited drawbacks to the insertion of nails loaded individually by hand into the nail passages, nail deflectors as heretofore arranged precluded the possibility of the loading by gravity of nails simultaneously into a plurality of nail passages from corresponding pockets in an auxiliary nail carrier, the said pockets of which had been initially filled with the nails by unskilled labor or by an automatic nail assorting mechanism during the nail driving operation of the machine as is well understood.

The object of this invention is accomplished by combining with nail deflectors operating in nail passages, mechanism adapted to retain the nail deflectors clear of the nail passages and to release the said nail deflectors to deflect the nail.

According to a preferred type of construction under this invention there is combined with the nail-conduit and a nail-deflector a yieldingly-supported member engaging and controlling the nail-deflector and arranged to be moved by the work out of a normal position for the purpose of projecting the nail-deflector into the nail conduit just prior to the driving of the nail so that it may be ready to deflect the point of the nail on the driving of the latter, and for withdrawing the deflector out of the nail conduit when the yieldingly-supported member is allowed to return to its normal position upon removal of the work, thus keeping the nail-conduits clear for reloading.

Preferably the yieldingly-supported member may be a nail-receiving tube adapted to rise and fall in relation to the horn, and normally kept at the upper limit of its travel by a spring or a weighted lever, the tube having a cam upon it directly engaging a nail deflector so that, when the tube is depressed against the resistance of its spring or weight by the work bearing upon its upper end, the cam moving with it allows the nail-deflector to be projected into the nail-receiving tube, while upon removal of the work the tube ascends and its cam causes the nail-deflector to return to its original position leaving the tube clear for reloading. A series of such nail-receiving tubes can be aggregated into or supported by a block; there may be a cam upon each tube to operate the deflector appropriated thereto. Or there may be a single cam for the series of tubes operatively connected to all the deflectors and actuating them simultaneously. The nail-receiving tube or tubes need not be employed to actuate the cam or cams, for it is within the present invention to provide a device other than the tube and adapted to be moved by the work for the purpose of operating the deflectors. It is also within the present invention to operate by a machine member a deflector or series of deflectors for the purpose of insuring the absence of deflectors from the nail-conduits at times when those conduits are to be loaded, even though the said machine member instead of being operated by the work is automatically controlled by the machine so as to be operated mechanically or electro-mechanically at a suitable point in each cycle of operation of said machine, say by a cam, or electrically by a machine-operated circuit-controller in a circuit in which an electro-magnet to actuate the deflectors is included. And it is equally within the present invention to provide said machine-member with a hand-lever or a foot-treadle for operating it non-automatically, for it had hitherto been necessary to force the nails each independently by hand into the nail passages so as to cause said nails to move the deflectors out of the nail passages. And the present invention is believed to be the first to provide a machine-member to accomplish this deflector-retracting operation by controlling the relative positions of the nail-deflector and nail-conduit either or both of which may move to effect their relative motion.

In the accompanying drawings:—Figure 1 is a side elevation of the upper end of a horn such as is employed in nail driving machines for attaching heels to boots or shoes, the horn being provided with nail deflectors constructed and operated in accordance with this invention; Fig. 2 is a section, of Fig. 1 taken on the line 2—2 of said Fig. 1; Fig. 3 is a plan of the horn shown in side elevation in Fig. 1; Fig. 4 is a part of Fig. 2 drawn to a scale larger than that of Fig. 2 to more clearly show the operative parts, which parts are in position to allow the nail-holding passages to be loaded with nails; Fig. 5 is a view similar to Fig. 4 with the parts of the mechanism in the position into which they are moved when the horn and work are brought into contact as shown prior to the driving of the nails out of the former into the latter; Fig. 6 is a view similar to Fig. 4 but with an alternative detail hereinafter more particularly referred to. Fig. 7 shows in vertical section another arrangement wherein certain of the details illustrated in Fig. 1 are modified; Fig. 8 is a side elevation somewhat similar to Fig. 1 but with a single plunger, instead of the nail tubes, to operate the deflectors; Fig. 9 is a vertical section of Fig. 8 taken on the line 9—9 of said Fig. 8; Fig. 10 is a plan of the horn illustrated in Fig. 8; Figs. 11 and 12 represent in plan and side elevation respectively a cam-ring forming part of the construction shown in Figs. 9 and 10. Fig. 13 shows a deflector slide in side view and Fig. 14 shows the same slide in plan; and Figs. 15 and 16 are two views of a circular spring forming part of the mechanism shown in Fig. 9. Fig. 17 is a view similar to Fig. 2 but illustrating a modification in which the several nail-receiving tubes are secured to a block provided with a rod capable of being automatically operated by some convenient part of the nailing machine so as to be operated mechanically or electromechanically at a suitable point at each cycle of operation of said machine, or capable of being operated non-automatically by a hand-lever or a foot treadle instead of or in addition to its automatic operation; Fig. 18 illustrates the construction shown in Fig. 9 modified to enable it to be operated automatically or non-automatically, or both automatically and non-automatically as in the case of Fig. 17 and having included in chain lines an arrangement of weighted lever which can be employed in substitution for the spring $H^\times$ shown in the upper portion of the figure.

Like letters of reference indicate like parts throughout all the figures in the drawings.

Referring to Figs. 1 to 5 the work-supporting horn A is made hollow and contains within its upper part a head B which forms part of a plunger C adapted to be reciprocated within the horn A. Attached to the head B are a number of drivers D which project upward into a corresponding number of nail-receiving tubes or conduits E into which the nails are to be loaded. The nail-receiving tubes or conduits the "machine members" in this exemplification of the present invention, form guides which maintain the drivers D in position to act on the heads of the nails and drive them into the heel of the boot or shoe or other work upon the upward movement of the head B, the bo. t or shoe being pressed against the upper surface of the horn A.

To deflect the points of the nails toward the center of the heel as they are being driven each nail-receiving tube or conduit E is provided with a deflector F which is located within a passage $A^0$ in the upper part of the horn A, each deflector F so engaging the nail tube as to prevent rotation of the latter and being arranged to project at certain times through a slot or opening E' in the wall of the nail-receiving tube or conduit and engage the nail (Fig. 5.)

The passages in which the deflectors F are located are arranged radially as shown in Fig. 3, and the deflectors F are pressed inward by separate springs or by a single spring acting simultaneously on all the deflectors, the latter being the one illustrated in the drawings and consisting of a rubber band G located within a groove A' surrounding the upper part of the horn A, the band G also fitting in grooves F' in the outer ends of the deflectors F.

Each nail-receiving tube E is arranged to project above the upper surface of the horn A and is kept yieldingly in its uppermost position by a spring H which surrounds the tube E and bears at one end against a collar $E^2$ formed thereon, the other end of the spring H bearing against a screwed plug I by which it is secured in place and by which the compression of the spring H can be adjusted. The collar $E^2$ forms a stop bearing against a shoulder in the bore in which the tube E moves and serving to prevent it from coming up out of the horn.

The lower end of the slot or opening E' in each tube E is made with a cam or incline $E^2$ which coöperates with a similar cam or incline $F^2$ formed on the inner end of the deflector F so that as the nail receiving tube or conduit E is pressed up by the spring H the deflector F is pushed back in opposition to the rubber spring G and the nail-receiving tube or conduit E is left with an unrestricted passage for the reception of the nail as clearly shown in Fig. 4. Moreover should the deflector be in the way of the tip of the nail-driver in the conduit, the driver will then act on the incline $F^2$ and, as the deflectors are yieldingly supported or "backed" by the spring G, return them without harm.

In driving the nails into the work the upper part of the horn is inserted in the boot X a portion of which is to be seen in Fig. 5. The boot moves the projecting ends of the nail receiving tubes or conduits E inward relatively to the horn A, and the tubes E are thus caused to move the cams or inclines $E^{2\times}$ away from the cams or inclines $F^2$ and allow the ends of the deflectors F to be protruded by the rubber spring G into the tubes by way of the slots in the walls of the nail-receiving tubes or conduits. The drivers D are then raised by any convenient operating mechanism and as the points of the nails are deflected by the deflectors F, (as shown at Y Fig. 5) the nails will be driven in an inclined direction convergently into the heel of the boot or shoe.

When the boot or shoe is removed from the horn the springs H will raise the nail-receiving tubes or conduits E and the inter-action of the cams or inclines $E^2$ and $F^2$ will remove the deflectors clear of the passages in the nail-receiving tubes or conduits E thus leaving them free to be reloaded with nails.

In the section shown in Fig. 6 a weighted lever H' is provided in substitution for the spring H described with reference to the preceding arrangement. The lever H' is weighted at $H^2$ and being centered at $H^3$ acts to lift the nail-receiving tube or conduit E into its elevated position, the end $H^4$ of the lever being slotted and engaging a stud or projection $E^3$ upon the said nail-receiving tube or conduit E.

In the arrangement shown in Fig. 7 a series of the nail-receiving tubes or conduits E is aggregated into or supported by an annular block $E^4$ which is adapted to slide within a recess in the head of the horn.

A central stem $A'^{\times}$ extends downward from the upper part of the horn and is screw-threaded at its lower end to receive a nut I' which is provided with an extension upon which the block $E^4$ is adapted to slide. Between the nut I' and the block $E^4$ is a spring $H^5$ which acts upon said block $E^4$ to maintain it and the nail-receiving tubes or conduits E secured thereto, normally in their elevated position.

Each nail-receiving tube or conduit E is provided with a deflector F constructed and arranged to act conjointly with the said receiving tube or conduit E in the same manner as already described with reference to the correspondingly-lettered parts illustrated in Figs. 1 to 5.

In the modification shown in Figs. 8 to 16 of the drawings the work-supporting horn is provided with a single "machine-member" which in the example is a plunger which may advantageously be located within an opening or recess $A^{\times}$ central in the work-supporting horn. The plunger $E^{\times}$ rests upon a spring $H^{\times}$ situated within a recess in the horn and is so arranged that a part of it will project above the upper surface of the horn so as to be in position to be depressed when the work is brought in contact with the horn or pressed between the horn and an abutment. The plunger $E^{\times}$ is provided with a spirally threaded part J which engages a nut K forming part of the horn A or so secured as not to be rotatable within it so that as the plunger $E^{\times}$ is depressed into the horn it will also receive a movement of partial rotation. A single cam plate L provided with cam slots L' is received in a recess in the horn in which it may turn about the axis of the plunger, and has a sleeve or boss $L^2$ (see Figs. 9 and 12) surrounding the plunger $E^{\times}$. A stop M secured to and projecting from the side of the plunger $E^{\times}$ extends into a gap $L^3$ formed in the sleeve $L^2$ and made to have clearance in relation to the projection for a purpose hereinafter explained. A spring N engaged by one of its ends with the nut K and by its other end with the sleeve $L^2$ tends always to rotate the sleeve $L^2$ in the direction opposite to that indicated by the arrow thereon.

Deflector slides $F^{\times}$ (see Figs. 13 and 14) are radially arranged (see Fig. 10) above the cam plate L; each slide $F^{\times}$ is movable endwise in guide channels in the head of the horn, lies across a nail passage $E^0$ therein, and is provided with a pin O which extends downward to engage that one of the cam slots L' that is appropriated to it in the cam plate L.

The nail conduits are constituted by those portions of the head of the horn in which are the passages $E^0$, these passages serving to receive the nails and to guide the drivers D as shown in Fig. 9.

As long as there is no work against the head of the work-supporting horn the plunger $E^{\times}$ occupies the position in which it is indicated in dotted lines in that figure; the cam plate L and its sleeve $L^2$ which as aforesaid are capable of rotation about the axis of the plunger will at such a time be in such a position in the arc of their rotation as to keep the pins O and therefore the deflectors $F^{\times}$ at the outer limit of their travel in the channels of the head, and to keep the smaller ends of openings P in the deflector slides in alinement with the passages $E^0$ in the work-supporting horn so as to leave these passages unobstructed and permit the free insertion of nails therein.

The direction in which the plunger moves when it is depressed upon contact between it and the work is indicated by the spiral arrow upon it, and the spring N (Figs. 9, 15 and 16) is so proportioned and arranged that it is capable of causing the sleeve $L^2$ to follow up the projection M through the whole of the small angular movement given to the latter in the descent of the plunger. In thus following the projection M to the fullest extent the sleeve $L^2$ and cam plate L would rotate sufficiently to draw the deflector slides $F^\times$ inward to the inner limit of their travel; but as will presently be explained the sleeve does not always follow the projection M through the full angular movement of the latter.

The portion of the deflector slide adjacent to one side of the smaller end of the hole P, which is chamfered or undercut as at P', constitutes the actual deflector, the chamfered surface being provided in order that when the drivers D move upward any portion of each deflector slide that may happen to lie in the path of a driver shall be moved by the thrust of the driver tip against the chamfer so that the upper and smaller end of the hole P shall become concentric with and afford passage for the driver.

Should a nail be present and in the path of the deflector slide in any passage $E^0$ when the deflector slides $F^\times$ are drawn inward by the action of the sleeve $L^2$ in following up as described the projection M under the influence of the spring N, the movement of the deflectors, cam plate L and sleeve $L^2$ will be stopped by the nail short of the maximum extent of their movement while the projection M and plunger $E^\times$ will continue to move in company in the direction of the spiral arrow in Fig. 9, and it is in order that the sleeve while thus stopped may offer no impediment to this continuation of the movement of the projection M and the plunger that it is arranged to be yieldingly actuated by the spring N and that there is the clearance aforesaid between the left side of the projection M as viewed in Fig. 9 and the gap in the sleeve. The same spring and clearance permits not only the stoppage of the sleeve but also allows it to be moved back in the direction of the arrow marked upon it in Fig. 9 when the chamfered portions of the deflector slides are acted upon by the driver tip in the manner hereinbefore set forth, or by a nail rising upward on and with the driver.

In Figs. 8, 9 and 10 the reciprocating head $B^\times$ which carries the drivers D is attached to a hollow slider $C^\times$ surrounding the stem $A^{\times\times}$ of the work supporting horn instead of being contained within it in the manner hereinbefore described with reference with Figs. 1 to 5. After the nails have been driven by the drivers D and the latter have been lowered by the usual mechanism the work is removed from the horn, the plunger $E^\times$ will be again caused to project above the upper surface of the horn by the action of the spring $H^\times$ and the deflector slides $F^\times$ moved outward to bring the openings P once more into line with the nail passages so as to leave the latter free to be reloaded with nails.

In the arrangement illustrated in Fig. 17 the nail-receiving tubes or conduits E are provided with cams or inclines $E^{2\times}$ which act on similar cams or inclines $F^2$ on spring actuated nail deflectors F to remove them from out of the passage of the nail-receiving tubes or conduits E when the said nail-receiving tubes are raised by the springs H into their uppermost or nail-receiving position in a manner similar to that described with reference to the arrangement shown in Fig. 2; but instead of the nail-receiving tubes or conduits E being depressed by their upper parts coming into contact with the work for the purpose of causing the deflectors F to act upon and deflect the nails within the nail-receiving tubes or conduits the latter are connected to a block or support $E^5$ situated within the horn the block or support being secured to or made integral with some movable part or member secured upon or forming an element of the machine for instance the operating-rod Q which passes downward through a passage in the work-supporting horn.

The tubes E may be automatically controlled to rise at appropriate times (under the action of the spring H) by connecting the machine member Q with a cam or with any moving part of the nail-driving machine so as to permit tubes E to so operate upon the deflectors F that their ends will be removed from the nail-passages and leave the latter free for the insertion of nails.

When the rod Q block $E^5$ and nail-receiving tubes E are lowered by the action of the cam or otherwise the cams or inclines $E^{2\times}$ on the nail-receiving passages or conduits E are removed from the cams or inclines $F^2$ on the deflectors F and the said deflectors are caused by the spring G to protrude into and deflect the nails within the passages.

In the arrangement shown in Fig. 18 the rod Q which may be controlled as above described is connected (by a joint permitting relative rotation of the parts Q and J) to the spirally-threaded part J of the plunger $E^\times$ of a construction otherwise the same as is shown in Fig. 9 aforesaid.

In Fig. 18 the plunger $E^\times$ does not extend above the upper surface of the horn and is therefore not in a position to be acted upon by the work but is raised and lowered by the rod Q.

The rod Q of Figs. 17 or 18 may be attached to a lever Q' (Fig. 18) centered at $Q^2$ and operated by the cam aforesaid and the plunger $E^\times$ may be kept in its raised position by the spring $H^\times$ or by a counterbalance weight $Q^3$ shown in chain lines.

What we claim as our invention and desire to secure by Letters Patent is:—

1. A nail-driving machine, having, in combination, nail-driving mechanism, a nail deflector arranged to control the insertion of a nail driven by said mechanism, and means for withdrawing said deflector from the path of the nail.

2. In a nail-driving machine the combination with a nail conduit and a nail-deflector yieldingly supported in order that it may yield to the nail driver or a nail moved thereby, of a yieldingly-supported machine member controlling the nail-deflector for the purpose described.

3. In a nail-driving machine the combination with a nail-conduit and a nail-deflector of a yieldingly-supported machine member controlling the nail-deflector for the purpose described and operated by the work.

4. In a nail-driving machine the combination with the horn of a machine member, a cam concentric with it, and means whereby the said machine member when depressed is caused to receive also a movement of rotation and to communicate that movement to the cam for the purpose described.

5. A nail-driving machine, having, in combination, a nail-conduit, a driver working in said conduit, and a nail deflector for controlling the position of a nail in said conduit arranged to be withdrawn from said conduit to permit the introduction of the nail.

6. In a nail-driving machine, the combination with relatively movable nail-driving mechanism and nail-guiding means, said nail-guiding means being constructed to remain normally out of the path of the nails, of means arranged to be actuated at a predetermined point in the cycle of operations of the machine for causing said nail-guiding means to assume operative position within the path of the nails.

7. In a nail-driving machine, the combination with a nail block provided with nail passages and drivers working in said passages, of nail deflectors arranged adjacent to the acting face of the nail block and movable into and out of said nail passages, a controlling member for said deflectors movably mounted in said nail block, and means for maintaining said member normally in position to retain said deflectors out of said nail passages.

8. In a nail-driving machine, a nail conduit, a driver arranged to move in said conduit, a nail-guiding device arranged adjacent to the discharge end of said conduit and movable into and out of the path of a nail guided by said conduit, means for yieldingly holding said guiding device in operative position in the path of the nail, and means for moving said guiding device out of said path to permit a nail to be supplied to the discharge end of the conduit.

9. In a nail-driving machine, the combination with a nail block having an acting face adapted to bear on the work and provided with driver passages terminating in said face, of nail deflectors supported adjacent to said face movable into and out of the path of the nails and maintained normally out of said path, and means arranged to be controlled by pressure of the work upon said nail block for moving said deflectors into effective position.

10. In a nail-driving machine, the combination with a nail block provided with a plurality of nail passages, drivers arranged to work in said passages, a plurality of nail guiding devices for said passages, and means for movably sustaining said devices arranged to permit them to be moved out of effective relation to said passages, of mechanism for simultaneously withdrawing said devices from the path of the nails.

11. A nail driving machine, having in combination, a nail conduit, a driver working in said conduit, a nail guiding device for controlling the position of a nail in said conduit prior to its entrance into the work constructed for yielding movement to accommodate the passage of the nail through said conduit, means for withdrawing said device from the path of the nail to permit the supply of the nail to said conduit, and means for returning said device to operative position.

In testimony whereof we have signed our names to this specification in the presence of two subscribing witnesses.

WILLIAM RODERICK BARCLAY.
ARTHUR BATES.

Witnesses:
ARTHUR ERNEST JERRAM,
JOHN RICHARD LAW.